United States Patent [19]

Yamamuro et al.

[11] Patent Number: 4,484,493
[45] Date of Patent: Nov. 27, 1984

[54] CONE PULLEY V-BELT CONTINUOUSLY VARIABLE TRANSMISSION

[75] Inventors: Sigeaki Yamamuro, Zushi; Hiroyuki Hirano, Yokosuka; Yoshikazu Tanaka, Yokohama; Yoshiro Morimoto, Yokosuka, all of Japan

[73] Assignee: Nissan Motor Company, Limited, Yokohama, Japan

[21] Appl. No.: 343,277

[22] Filed: Jan. 27, 1982

[30] Foreign Application Priority Data

Feb. 24, 1981 [JP] Japan ................................. 56-24970

[51] Int. Cl.³ ...................... F16H 37/00; F16D 21/04; F16H 11/00
[52] U.S. Cl. ...................................... 74/689; 474/72; 192/20
[58] Field of Search ................. 74/689; 474/72, 8, 18, 474/28, 32; 192/6 A, 20

[56] References Cited

U.S. PATENT DOCUMENTS

| 2,215,831 | 9/1940 | Heyer | 474/15 |
| 2,556,512 | 6/1951 | Ammon | 474/14 |
| 2,916,949 | 12/1959 | Smith et al. | 74/689 |
| 3,108,481 | 10/1963 | Westmont | 474/5 |
| 3,178,965 | 4/1965 | Mayfield et al. | 74/689 |
| 3,289,496 | 12/1966 | Hoover | 74/689 |
| 4,094,203 | 6/1978 | van Deusen et al. | 474/28 |
| 4,125,037 | 11/1978 | Palmer et al. | 74/732 |
| 4,136,581 | 1/1979 | Winter et al. | 474/32 |
| 4,138,006 | 2/1979 | Benson, Jr. | 74/361 X |
| 4,229,988 | 10/1980 | Rattunde | 474/28 |

FOREIGN PATENT DOCUMENTS

| 1256023 | 12/1967 | Fed. Rep. of Germany . |
| 1414399 | 11/1964 | France . |
| 1474000 | 2/1967 | France . |
| 2340487 | 9/1977 | France . |
| 55-63051 | 5/1980 | Japan . |
| 1106790 | 3/1968 | United Kingdom . |
| 2025545 | 1/1980 | United Kingdom . |

Primary Examiner—Leslie A. Braun
Assistant Examiner—Bruce F. Wojciechowski
Attorney, Agent, or Firm—Schwartz, Jeffery, Schwaab, Mack, Blumenthal & Koch

[57] ABSTRACT

A continuously variable transmission comprising driving and driven pulleys and a V-belt interconnecting these pulleys. A forward gear is rotatably mounted on a driven shaft and a multiple disc friction clutch is mounted within the driven pulley and operative to connect the driven pulley to the forward gear.

1 Claim, 2 Drawing Figures

CONE PULLEY V-BELT CONTINUOUSLY VARIABLE TRANSMISSION

BACKGROUND OF THE INVENTION

1. Field of the Invention

The present invention relates to a continuously variable transmission.

2. Description of the Prior Art

A known continuously variable transmission comprises driving and driven cone pulleys and a V-cross sectioned belt (referred hereinafter as a V-belt) interconnecting the pulleys, wherein drive is transmitted from the driving pulley to the driven pulley. Each of the pulleys has an axially fixed cone pulley disc fixed on a shaft and an axially movable facing cone pulley disc slidable on the shaft. The axially movable cone pulley disc is controllably moved toward and away from the axially fixed cone pulley disc to change a drive ratio.

In the known continuously variable transmission, the drive (engine power) is transmitted to the driving pulley on a driving shaft via a torque converter. Thus, drive is transmitted to the driving shaft even at idling operation of the engine owing to the provision of the torque converter. Therefore, it has been a conventional practice as disclosed in Tokkai (laid open Japanese patent application) No. Sho 55-63051 to provide a friction clutch in order to interrupt the transmission of drive for the purpose of providing a neutral state.

SUMMARY OF THE INVENTION

According to the present invention, a space saving clutch arrangement is provided wherein a multiple disc friction clutch is mounted within a driven pulley rotatable with a driven shaft of a continuously variable transmission to establish a drive connection between the driven pulley and a differential. More specifically, a forward gear is rotatably mounted on the driven shaft and drivingly connects with the differential. The clutch has a driving part rotatable with an axially fixed pulley disc of the driven pulley and a driven part fixed to the forward gear.

Accordingly, an object of the present invention is to provide a space saving arrangement of a clutch within a transmission case of a continously variable transmission.

DESCRIPTION OF THE PREFERRED EMBODIMENT

Figure 1:
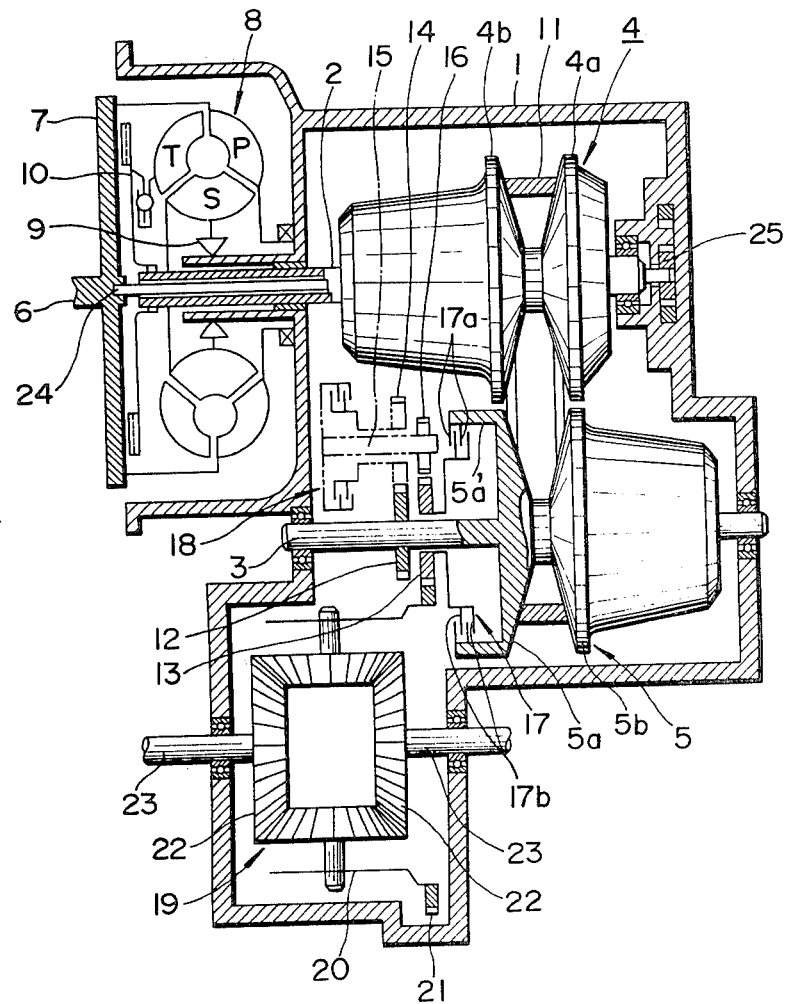
FIG. 1 is a schematic axial section of a transaxle for a front wheel front drive motor vehicle with a transverse engine, the transaxle incorporating a cone pulley V-belt continuously variable transmission.

Referring to FIG. 1, a transmission case 1 has rotatably mounted therein a driving shaft 2 and a driven shaft 3 arranged in parallel, a driving cone pulley 4 rotatable with the shaft 2, and a driven cone pulley 5 rotatable with the shaft 3. The driving shaft 2 is driven by a crank shaft 6 with a flywheel 7 via a torque converter 8. The torque converter 8 has in a usual manner an impeller P connected to the flywheel 7, a turbine runner T to the driving shaft 2 and a stator S to the transmission case 1 via a one-way clutch 9. Mounted within the torque converter 8 is a direct clutch 10 which is operative to be pressed against the flywheel 7 to drivingly connect the turbine runner T to the flywheel 7. Although, in FIG. 1, the flywheel 7 defines part of the torque converter 8, a flywheel may be a separate member from the torque converter 8.

The driving pulley 4 includes an axially fixed cone pulley disc 4a fixedly mounted on the driving shaft 2 and an axially movable facing cone pulley disc 4b axially slidable on the driving shaft 2. The driven pulley 5 includes an axially fixed cone pulley disc 5a fixedly mounted on the driven shaft 3 and an axially movable facing cone disc 5b axially slidable on the driven shaft 3. The driving pulley 4 and driven pulley 5 are interconnected by a metal belt having a V-cross section, viz., a V-belt.

The driven shaft 3 has thereon a reverse gear 12 and a forward gear 13. The reverse gear 12 is fixedly mounted on the driven shaft for rotation therewith. The forward gear 13 is rotatably mounted on the driven shaft 3. An intermediate gear 14 meshes with the reverse gear 12 and is rotatably mounted on an intermediate shaft 15 on which a reverse idler gear 16 is fixedly mounted. A multiple disc friction clutch 17 which is operative to connect the forward gear 13 to the driven shaft 3 is mounted within the fixed cone pulley disc 5a of the driven pulley 5. The fixed cone pulley disc 5a is recessed on that side thereof which faces the forward gear 13 to provide an annular recess 5a'. The multiple disc friction clutch 17 has a driving part, viz., driving clutch plates 17a, drivingly connected to the outer circumferential wall of the annular recess and a driven part, i.e., driven clutch plates 17b, drivingly connected to the forward gear 13. The driven clutch plates 17b and driving clutch plates 17a are interleaved to form the multiple disc friction clutch 17. Another multiple disc friction clutch 18 is provided to drivingly connect the intermediate gear 14 to the intermediate shaft 15.

Figure 2:
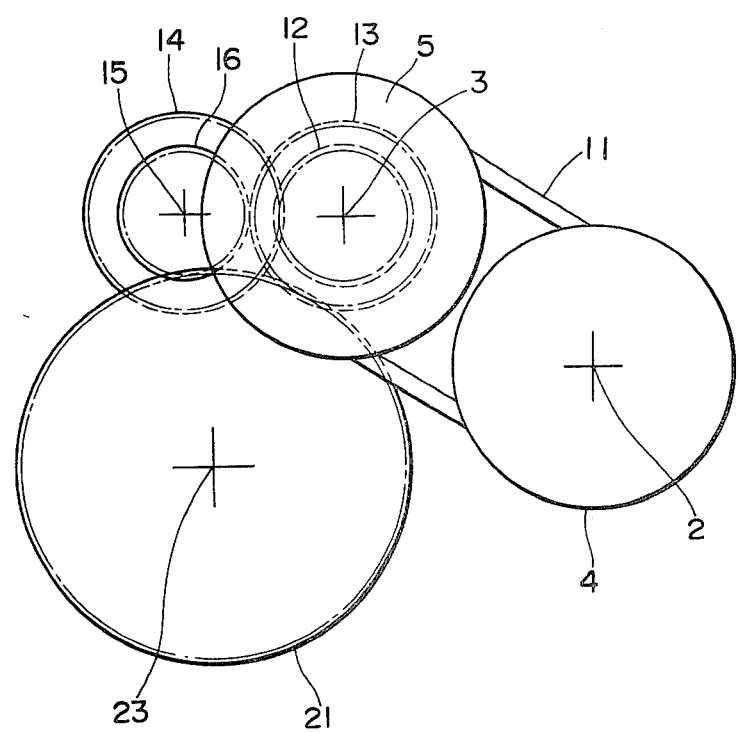
FIG. 2 is a schematic view illustrating the actual arrangement of the component parts forming a power train of the transaxle.

As clearly shown in FIG. 2, the forward gear 13 and reverse idler gear 16 mesh with a ring gear 21 of a differential 19, at angularly displaced positions. The ring gear 21 is fixedly mounted to a gear carrier 20 of the differential 19, while, axle shafts 23 attached to both side gears 22 of the differential 19 are journalled on the transmission case 1 and extend toward traction wheels, viz., front wheels in this embodiment, of the vehicle.

The driving shaft 2 is hollowed to allow a pump driving shaft 24 to extend therethrough. The pump driving shaft 24 has one end connected to the crank shaft 6 and the other end connected to the gear pump 25, thus allowing the engine to drive the gear pump 25 at all times. The oil pressure produced by the pump 25 is used for actuation of the multiple disc friction clutches 17, 18. It is used also for the position control of the axially movable pulley discs 4b, 5b of the pulleys for the purpose of changing a drive ratio.

The operation is hereinafter explained.

Drive is transmitted from the engine crank shaft 6 to the driving shaft 2 through torque multiplication by the torque converter 8. It is transmitted from this driving shaft 2 to the driven shaft 3 by the pulley 4, V-belt 11 and pulley 5. When the transmission is in neutral, the multiple disc friction clutches 17, 18 are both disengaged so that there is no power transmission from the driven shaft 3 to the forward gear 13 and reverse idler 16, keeping the differential 19 inoperative with the result that the vehicle is at rest.

To establish the forward drive range, the multiple disc friction clutch 17 is engaged to drivingly connect the forward gear 13 to the fixed pulley disc 5a fixed to the driven shaft 3. Then, the driven pulley 5 can drive the forward gear 13 meshing with the ring gear 21 of the differential 19, thus allowing the vehicle to move forwardly. A shock inherent with the engagement of the multiple disc friction clutch 17 is alleviated by the torque converter 8. When the vehicle moves off from rest, the axially movable pulley discs 4b, 5b are held by the oil pressure from the gear pump 25 to the limit position axially spaced fully apart from the fixed pulley disc 4a and to the limit position axially nearest to the fixed pulley disc 5a, thus providing the highest reduction ratio in the transmission for ease of movement of the vehicle from the rest. From this time onwards, a reduction ratio is automatically controlled in the known manner in response to the operating conditions of the vehicle by adjusting the axial positions of the movable pulley discs 4b, 5b.

During such forward movement of the vehicle, when the vehicle operates within an operation range where the torque multiplication by the torque converter 8 is not required, the direct clutch 10 is actuated to directly connect the turbine runner T to the flywheel 7, allowing the engine power to be fed directly to the driven shaft 2 bypassing the torque converter 8.

For establishing the reverse drive range, the multiple disc friction clutch 18 is engaged to directly connect the intermediate gear 14 to the intermediate shaft 15, establishing the transmission of drive from the driven shaft 3 through the reverse gear 12, intermediate gear 14, multiple disc friction clutch 18, intermediate shaft 15 and reverse idler 16 to the ring gear 21, rotating in the reverse direction the traction wheels via the differential 19, allowing the vehicle to move rearwardly.

The clutch arrangement of mounting the multiple disc friction clutch 17 within the axially fixed pulley disc 5a of the driven pulley 5 provides a compact continuously variable transmission, which is not only compact in the axial direction but also in radial direction.

Referring to the arrangement of the other multiple disc friction clutch 18 in the illustrated embodiment, a mounting space for it is not difficult to find within the transmission case 1. This is because the multiple disc friction clutch 18 is for use in reverse drive and relatively compact in construction owing to the fact that a large torque transmission capacity and long endurability are not required for the reverse clutch.

What is claimed is:

1. A continuously variable transmission for a motor vehicle, comprising:
    a driving shaft;
    a driven shaft;
    a driving pulley including an axially fixed pulley disc fixedly mounted on said driving shaft and an axially movable pulley disc slidable on said driving shaft;
    a driven pulley including an axially fixed pulley disc fixedly mounted on said driven shaft and an axially movable pulley disc slidable on said driven shaft;
    a V-belt interconnecting said driving and driven pulleys;
    a differential having a ring gear; and
    direction-change gearing driven by said driven shaft and in turn driving said ring gear of said differential, said direction change gearing including a forward gear rotatably mounted on said driven shaft and meshing with said ring gear of said differential, a reverse gear fixedly mounted on said driven shaft, said forward gear being mounted between said driven pulley and said reverse gear, an intermediate shaft, an intermediate gear rotatably mounted on said intermediate shaft and meshing with said reverse gear, an idler gear fixedly mounted on said intermediate shaft and meshing with said ring gear of said differential, a first multiple disc friction clutch selectively connecting said forward gear to said driven shaft, and a second multiple disc friction clutch selectively connecting said intermediate gear to said intermediate shaft, wherein said first multiple disc friction clutch is disposed in an annular recess formed in said axially fixed cone pulley disc of said driven pulley.

* * * * *